United States Patent Office
3,561,172
Patented Feb. 9, 1971

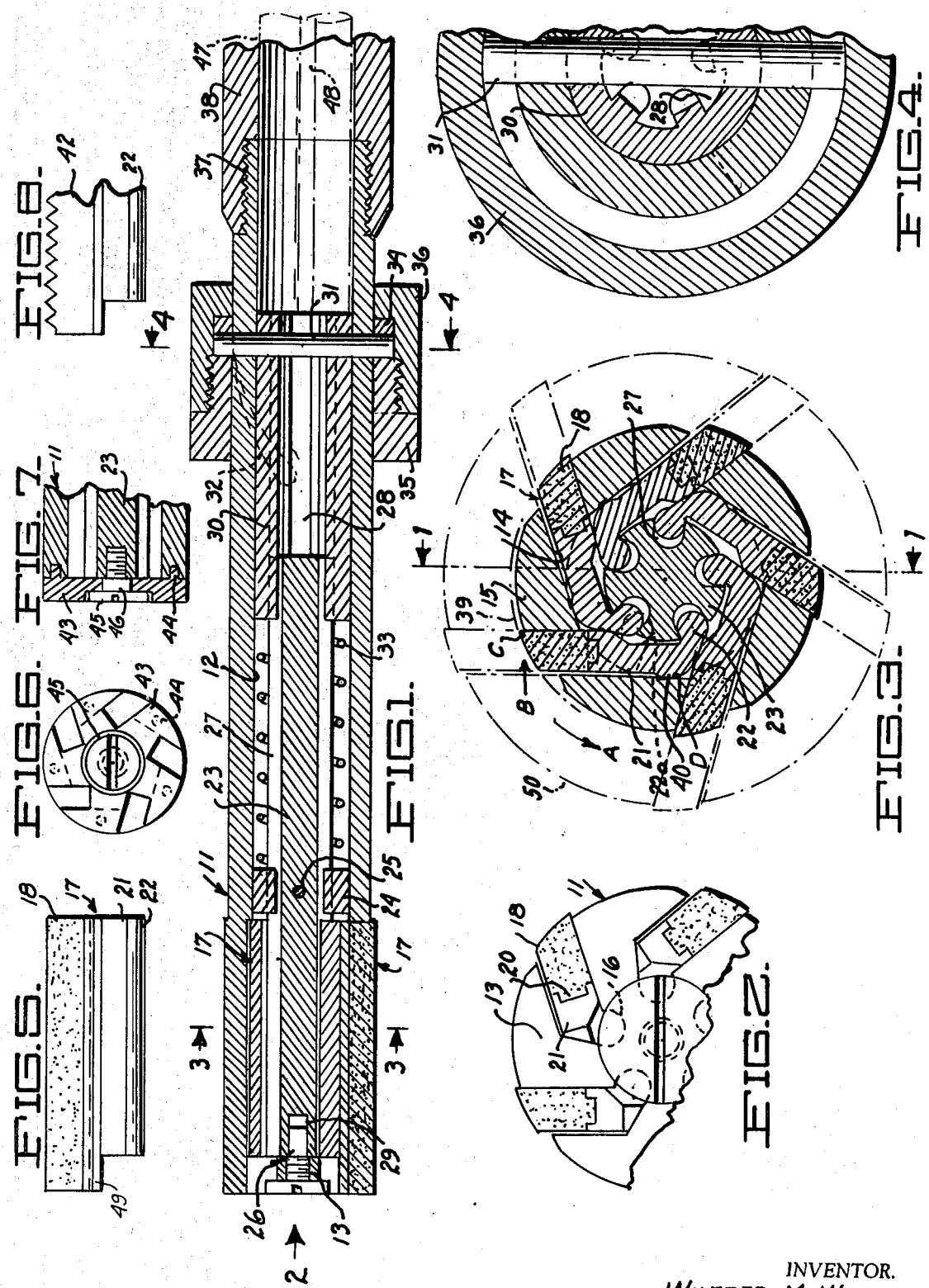

3,561,172
METAL FINISHING TOOL
Wilfred M. Werner, Arcadia, and Herman P. Hommerson San Gabriel, Calif., assignors to Advance Honing Products, Inc., El Monte, Calif., a corporation of California
Filed Mar. 10, 1969, Ser. No. 805,478
Int. Cl. B24b 9/02
U.S. Cl. 51—331                                       12 Claims

ABSTRACT OF THE DISCLOSURE

A metal finishing tool for honing or the like is disclosed and comprises a hollow mandrel having angularly spaced slots extending through the mandrel walls tangentially of the inner periphery thereof. Honing tool elements are slideable in the slots and have cylindrical portions thereon engaged in radial slots formed in an actuator shaft which is rotatably supported in the mandrel. An actuator sleeve on the mandrel is slideably keyed to the shaft and has a pin therein extending through helical grooves formed in the mandrel whereby endwise movement of the sleeve will rotate the actuator shaft to expand the honing tool elements outwardly in unison. Other types of metal finishing tool elements may be substituted for the honing elements.

---

This invention relates to metal surface finishing tools and has particular reference to tools capable of honing, lapping, grinding, cutting, or otherwise finishing the internal surface of a workpiece.

Heretofore, machine tools of the above type have generally comprised a hollow mandrel with radially extending slots in the walls thereof in which are slideably mounted one or more abrasive tools. Also, in most such cases, the abrasive tools are independently yieldably urged outward to engage the surface of the workpiece. Although such tools are generally satisfactory, we have found that they tend to "chatter" or vibrate upon frictional engagement with the surface of the workpiece due, in part, to their location adjacent the radial plane of the mandrel. This tends to break down the stones or other abrasive material and, in some cases, results in "chatter marks" in the surface being finished. Also, where independent springs support the stones, such springs tend to cause the stones to follow the contour of any irregularities in the surface being finished. Thus, if the surface is slightly oval or conical instead of truly cylindrical, the tool elements may finish the surface but they will not correct such contour irregularities.

It therefore becomes a principal object of the present invention to provide a machine tool of the above type in which vibration or "chatter" is reduced to a minimum.

Another object is to provide a machine tool of the above type which will hone or otherwise finish the inner cylindrical periphery of a workpiece and will also correct any out-of-round configuration thereof.

Another object is to provide a machine tool of the above type which will enable a relatively large number of tool elements to be mounted in a relatively small mandrel.

Another object is to provide a machine tool of the above type which may also be used as an expandable arbor for supporting hollow workpieces.

A further object is to provide a simple and yet reliable machine tool of the above type which is inexpensive to manufacture and assemble.

The manner in which the above and other objects of the invention are accomplished will be readily understood on reference to the following specification when read in conjunction with the accompanying drawings, wherein:

FIG. 1 is a longitudinal sectional view through a tool embodying a preferred form of the present invention.

FIG. 2 is an end view taken in the direction of the arrow 2 of FIG. 1.

FIG. 3 is a transverse sectional view taken along line 3—3 of FIG. 1.

FIG. 4 is a transverse sectional view, partly broken away, and taken along the line 4—4 of FIG. 1.

FIG. 5 is a side view of one of the abrasive tool elements.

FIGS. 6 and 7 illustrate a modified form of the invention.

FIG. 8 is a view similar to FIG. 5, with parts broken away, illustrating a thread chasing tool element.

Referring to the drawings, a hollow cylindrical mandrel 11 is provided having a cylindrical bore 12 extending therethrough and terminating at its left hand in an end wall 13. A plurality of equi-angularly spaced slots 14 are formed in the left-hand section of the mandrel wall. Such slots are rectangular in cross section and the left-hand or advancing side of each, as viewed in FIG. 3, extends substantially tangent to the periphery of the bore 12, thus forming lands 15 which are roughly triangular in cross section.

Each slot 14 extends through the end wall 13. However, the inner end of each slot formed in the end wall terminates in a semi-cylindrical shape 16 for a purpose, to be described later.

Abrasive tool elements 17 are fitted in the slots and are slideable in and out relative to the bore 12 but are each prevented from endwise movement by engagement with the radial wall 13 at one end and by the right hand ends of the respective slots at the other end. Each tool 17 comprises a honing element or abrasive stone 18 having a tongue formation 20 extending therealong which is secured by a suitable adhesive within a grooved portion formed in a metal holder 21. The latter has a substantially cylindrical portion 22 extending therealong and to one side thereof.

A fluted actuator shaft 23 is rotatably mounted within the mandrel and for this purpose is secured within a bearing bushing 24 by a pin 25, the bushing being rotatable within the bore 12. The left-hand end of the shaft 23 is rotatably supported by a bearing pin 26 which is screw-threaded into the end wall 13 and is fitted within a bearing hole 29 formed in the end of the shaft.

Substantially radially extending slots 27 are formed along the shaft 23, the opposite sides of which are substantially parallel and terminate in semi-cylindrical bottoming sections. The sides of each slot embrace opposite sides of the cylindrical portion 22 of the associated tool element 17. It will be noted that this embracement extends along the entire length of each tool element, thereby providing a sturdy, non-yieldable connection between the shaft and the tool elements. This embracement will remain in effect in different rocked positions of the shaft.

The right-hand end of the shaft 23 is slideably fitted within grooves 28 formed in an actuator sleeve 30 which is rotatable and slideable within the bore 12, thus forming a keyed connection with the shaft. A cross pin 31 extends through the sleeve 30 and through helical guide slots in the opposite side wall portions of the mandrel, one of which slots is shown by the dot-dash lines 32.

Normally, the sleeve 30 is held in its right-hand illustrated position by a spring 33 which is compressed between the bearing bushing 24 and the sleeve, thereby holding the pin 31 against the right-hand ends of the helical slots. In this position, the shaft 23 is held to maintain the tool elements 17 in maximum withdrawn positions within the mandrel, as shown in FIG. 3.

Means are provided for manually or otherwise rotating the shaft 23 relative to the mandrel 11 to move the tool elements 17 outwardly in unison while the mandrel is either being rotated or is stationary. For this purpose, the pin 31 extends beyond the wall of the mandrel and against a hardened bearing ring 34 which is held in place by a pair of sleeve members 35 and 36 which are screw-threaded together and are slideable along the mandrel.

The mandrel is screw-threaded at 37 to an adapter 38 which may be rotated by a suitable device, such as a portable drill or other power tool (not shown).

In operation, the mandrel is inserted into the workpiece to be honed and is then rotated in the direction of the arrow A (FIG. 3). The sleeve 35–36 is advanced to the left, causing clockwise rotation of the shaft relative to the mandrel so as to expand the tool elements outwardly in unison until they engage the inner surface of the workpiece as indicated by the dot-dash lines 39 in FIG. 3.

It will be noted that each tool element 17 has an extending portion 49 which terminates flush with the left hand end of the mandrel wall 13. Thus, the tool can be used to hone blind holes as well as through holes. Also it will be noted that each tool element 17 has a slightly projecting or bulging bearing portion 40 (FIG. 3) adjacent its inner end and extending along the entire length thereof so that when the mandrel is rotated counterclockwise relative to the workpiece, a force will be exerted against the tool element in the direction of the arrow B and the latter will bear against the mandrel along the leading and trailing sides at the edges C and D. The edge C is located directly adjacent the point of engagement of the stone with the workpiece and therefore a maximum amount of rigidity is provided. Also, the contact edge D which is along the portion 40, is located at a maximum distance from edge C so as to further provide maximum rigidity and reduce "chattering" and binding. Because the slots 14 are located substantially tangentially of the bore, they extend a maximum depth for a given mandrel wall thickness. This also provides a maximum of rigidity to the tool. Further, because of the tangential arrangement of the slots and tool elements, a dragging effect on the stones is produced which also reduces "chattering." An additional feature resulting from this construction is that the shaft 23 forms a non-yielding connection with all of the tool elements 17 so that they will expand in unison to self-center the mandrel in the workpiece and to rapidly and accurately form a true cylindrical surface.

Each land 15 is relieved slightly at 19 along its length to permit the accumulation of grit or abraded metal particles therealong.

The helical slots 32 are preferably of such length that the shaft 23 can only be rotated a limited amount, i.e. until the cylindrical portion 22 of each tool element reaches a location shown by the dot-dash lines 22a wherein the sides of the slots 27 still engage the cylindrical portions. Because of the engagement of the cylindrical portions 22 by the opposite sides of the associated shaft slots 27 in all rocked conditions of the shaft 23, the tool elements will be prevented from flying outward under centrifugal force in the event the mandrel is rotated while not inserted in a workpiece.

When it is desired to remove or replace the tool elements 17, the bearing pin 26 is removed and shaft 23 is rotated clockwise (in FIG. 3) to expand the tool elements to their outermost positions wherein their cylindrical portions 22 assume their alternate positions indicated by the dot-dash lines 22a. In this position the portions 22 are aligned with the openings 16 in the end wall 13, permitting them to be withdrawn endwise through the end wall 13. If desired, a stop screw 49 may be removably secured to the mandrel in position to prevent full leftward movement of the sleeve 35–36, thus preventing the tool elements from being withdrawn through the end wall of the mandrel until the screw is removed.

Other tool elements, such as lapping elements, thread chasers (as shown partly at 42 in FIG. 8), surface cutting tools, etc. may be substituted for the tool elements 17.

Such tool elements may have a continuous level cutting surface as shown in FIG. 5 or may have any desired configuration. Also, hardened steel cutting, lapping or burnishing elements (not shown) may be substituted for the abrasive stones 18.

The tool elements 17 have been omitted in these views for the sake of clarity.

FIGS. 6 and 7 illustrate a modified form of the invention wherein the end wall portion 13 is removed and an end cap 43 is mounted in its place, the latter having a plurality of pins 44 thereon fitted in aligned holes formed in the lands of the mandrel. A bearing pin 45 is threaded into the end of the shaft 23 and has a journal bearing section 46 which is rotatable in a bearing formed in the end cap. In this case, the pins 44 may be press-fitted into their sockets so as to retain the end cap in place or suitable screws (not shown) may be used for this purpose.

In the event the mandrel is to be driven by a suitable power device having an opening therein coextensive with the bore 12, a plunger, indicated by dot-and-dash lines 47 may be slidably mounted in the bore and by pressing endwise, to the left, on such plunger, in lieu of the sleeve 35–36, the sleeve 30 may be actuated to cause rotation of the shaft 23 to thereby expand the tool element. Such plunger has an axially formed hole 48 therethrough, permitting cutting or abrading fluid to be forced therethrough. Such fluid will pass endwise through the grooves 27 and 28 so as to flow outwardly around the tool elements 17.

As noted heretofore, the mandrel may also be used as an expanding arbor wherein suitable tool elements are fitted therein in lieu of the abrasion tool elements 17 so as to support a hollow workpiece, tubing or the like, concentrically of the mandrel for rotation relative to suitable cutting or grinding tools.

The portion of the mandrel surrounding the slots 14 may be formed of a different diameter as indicated, for example, by the dot-dash lines 50 to hone or otherwise finish a wide range of hole diameters, in which case the same tool holder elements 21 may be retained but deeper stones 18 would be secured thereto.

I claim:
1. A machine tool comprising a hollow mandrel,
said mandrel having a plurality of spaced slots extending through the wall thereof,
one side of each of said slots extending at least substantially tangent to the inner periphery of said mandrel,
a shaft rotatable in said mandrel,
workpiece engaging members slideable in said slots for movement inwardly and outwardly relative to said mandrel,
said members being adapted to engage the inner periphery of a hollow workpiece, and
interengaging surfaces on said shaft and said members,
said interengaging surfaces extending lengthwise of said shaft and said members whereby rotation of said shaft relative to said mandrel will move said members outwardly.

2. A machine tool according to claim 1 wherein said workpiece engaging members comprise abrasive elements 3. A machine tool according to claim 1 wherein said interengaging surfaces comprise at least substantially cylindrical surfaces on said members and at least substantially radial slots in said shaft,
the sides of said slots being engageable with opposite sides of said cylindrical surfaces.

4. A machine tool according to claim 1 comprising bearings in said mandrel rotatably supporting said shaft.

5. A machine tool according to claim 3 comprising means for limiting rotation of said shaft to a predetermined amount relative to said mandrel.

6. A machine tool according to claim 2 wherein the leading sides of said members engage the sides of respective ones of said slots adjacent the inner periphery of said mandrel and the trailing sides of said members engage the sides of respective ones of said slots adjacent the outer periphery of said mandrel.

7. A machine tool according to claim 2 comprising an actuator slideably and rotatably mounted in said mandrel,
said actuator being slideably keyed to said shaft, and
a helical guideway in said mandrel for guiding said actuator in a helical path upon movement of said actuator lengthwise of said mandrel.

8. A machine tool according to claim 6 comprising a helical guideway in said mandrel,
an actuator slideably and rotatably mounted in said mandrel,
said actuator being slideably keyed to said shaft,
means for causing said actuator to follow said helical guideway upon endwise movement of said actuator relative to said mandrel, and
means for moving said actuator.

9. A machine tool according to claim 8 wherein said last mentioned means comprises a sleeve slideable along the outer periphery of said mandrel and operatively connected to said actuator.

10. A machine tool according to claim 9 comprising, spring means for urging said actuator in one direction along said mandrel.

11. A machine tool comprising a hollow mandrel,
said mandrel having a plurality of spaced slots extending through the wall thereof,
one side of each of said slots extending at least substantially tangent to the inner periphery of said mandrel,
a shaft rotatable in said mandrel,
workpiece engaging members slideable in said slots for movement inwardly and outwardly relative to said mandrel,
said members being adapted to engage the inner periphery of a hollow workpiece,
at least substantially cylindrical surfaces on said members extending parallel to the axis of rotation of said shaft, and
substantially radially extending slots in said shaft embracing said cylindrical surfaces whereby rotation of said shaft relative to said mandrel will move said members outwardly.

12. An abrasing member for an abrading machine tool comprising
an elongate abrading element of abrasive material having parallel sides and an abrading side edge,
and an elongate holder adhered to the side edge of said element opposite said abrading side edge,
said holder having side portions contiguous with said sides of said abrading element,
said holder having a partially cylindrical formation extending along the side edge thereof opposite said abrading element,
the axis of said partially cylindrical formation extending parallel to the length of said abrading element,
and said partially cylindrical formation extending through an angle greater than 180°.

References Cited
UNITED STATES PATENTS
1,853,365  4/1932  Lindroth _____ 51—331
2,694,885  11/1954 Peden _____ 51—331

FOREIGN PATENTS
309,643  11/1955  Switzerland.

OTHELL M. SIMPSON, Primary Examiner